United States Patent
Hurley-Smith et al.

(10) Patent No.: US 12,321,718 B2
(45) Date of Patent: *Jun. 3, 2025

(54) TRUE RANDOM NUMBER GENERATION BASED ON INSTRUMENT DATA

(71) Applicant: VEIOVIA LIMITED, York (GB)

(72) Inventors: Darren Hurley-Smith, Kent (GB); Alastair Droop, York (GB); Remy Lyon, New York, NY (US); Roxana Iuliana Teodor, York (GB)

(73) Assignee: Veiovia Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,503

(22) Filed: Jan. 12, 2024

(65) Prior Publication Data

US 2025/0053381 A1 Feb. 13, 2025

Related U.S. Application Data

(63) Continuation of application No. 18/448,854, filed on Aug. 11, 2023, now Pat. No. 11,907,686.

(51) Int. Cl.
*G06F 7/58* (2006.01)
(52) U.S. Cl.
CPC ................................ *G06F 7/588* (2013.01)

(58) Field of Classification Search
USPC ........................................................ 708/255
See application file for complete search history.

(56) References Cited

U.S. PATENT DOCUMENTS 8,307,022 B2 11/2012 Matsumoto et al.
2012/0176159 A1 7/2012 Webb, III et al.

FOREIGN PATENT DOCUMENTS

WO 2017151719 A1 9/2017

*Primary Examiner* — Tan V Mai
(74) *Attorney, Agent, or Firm* — Baker Botts L.L.P.

(57) ABSTRACT

The present disclosure provides computing apparatuses, methods and software for generating random numbers. Data is received from an instrument characterising macromolecules in a sample, the data including measurement event information relating to measurements of individual macromolecules recorded over time. For each measurement event in a sequence of measurement events in the data, an event timing representative of the duration of event or the time passing between consecutive events is determined. This is compared with a comparator value to generate a binary output, and a bit value is determined based on the binary output. Data representative of a random number is generated by assembling a vector of bit values determined from the event timings in sequence. The determined sequence of event timings for the sequence of measurement events represents a source of entropy extracted by the comparison step to generate the random number.

19 Claims, 7 Drawing Sheets

Algorithm 2 VV2B Entropy Extraction Algorithm
for $i \in f$ do
   if $(l[i] \mod 2) == 0$ then
     $b \leftarrow 0$
   else if $(l[i] \mod 2) \neq 0$ then
     $b \leftarrow 1$
   end if
   $v.append(b)$
end for

```
Algorithm 1 VV2A Entropy Extraction Algorithm
    for i ∈ f do
        if g[i] ≤ g[i + 1] then
            b ← 0
        else if g[i] ≥ g[i + 1] then
            b ← 1
        end if
        v.append(b)
    end for
```

TRUE RANDOM NUMBER GENERATION BASED ON INSTRUMENT DATA

CROSS REFERENCE TO RELATED APPLICATIONS

This application is a continuation of U.S. patent application Ser. No. 18/448,854, filed Aug. 11, 2023, which is hereby incorporated by reference in its entirety.

TECHNICAL FIELD

The present disclosure relates to generating random numbers. In particular, the disclosure provides methods, apparatuses and computer program products for true random number generation based on sequencing instrument data.

BACKGROUND

Randomness plays a pivotal role in various critical technical operations and protocols that are integral to our daily activities, including secure communication, cryptography and secure public lotteries and gaming. However, meeting the substantial demand for unbiased and scalable randomness has remained a significant challenge. Existing solutions have yet to provide a source of public randomness capable of fulfilling these essential requirements. As such, there is a need for a novel approach that addresses these limitations and offers a more robust and efficient solution for generating unbiased randomness at scale.

Random number generator design is a highly varied field, with many approaches, misconceptions, and specific requirements. Random number generators can be divided into two broad categories: Pseudo random number generators (PRNG), and 'true' random number generators (TRNG). PRNGs rely on algorithms and some system-supplied entropy to generate random numbers by an unpredictable process. Random, the Linux staple PRNG, is a good example of this. It is a cryptographically secure PRNG that uses a locally stored entropy pool to seed random number generation through a process of cryptographically secure hashing. Urandom is the non-blocking version of Random, where outputs will be generated even if there is insufficient entropy in the pool to reseed the generator.

A true random number generator (TRNG) is a device or process that generates random numbers using a source of true randomness from the physical world. Unlike pseudo-random number generators (PRNGs), which use algorithms to produce sequences of numbers that appear random but are determined by a starting value called a seed, TRNGs rely on inherently unpredictable physical processes or phenomena to generate random data.

The key characteristic of a TRNG is its ability to provide truly unpredictable and statistically random numbers that cannot be feasibly reproduced, even with complete knowledge of the generator's internal state or previous output. These random numbers are said to exhibit "entropy," which is a measure of the unpredictability and randomness of a data source.

TRNGs exploit some naturally unpredictable process, which supplies entropy for use in either direct conversion to binary values or as raw material for a cryptographic or hash function. TRNGs can utilize various physical phenomena as sources of entropy, such as:

Thermal Noise: Random fluctuations in electrical voltages or currents due to thermal effects in electronic components.

Radioactive Decay: The timing of radioactive decay events, which is a fundamentally random process. For example, Americium and unstable Nickel isotopes are used in a variety of random number generators.

Atmospheric Noise: Random variations in radio frequencies caused by atmospheric conditions.

Electronic Component Noise: Random fluctuations in electronic components like resistors or diodes. One example is ChaosKey, which uses ring oscillators to provide randomness as expressed through the unpredictable phase and frequency values of ring oscillators over short time periods.

Quantum processes: Quantum Phenomena may be used by a special class of TRNGs. Certain quantum processes, like photon emission, may be harnessed that are inherently random and unpredictable. For example, ID Quantique has developed a range of NIST-certified security products incorporating optical sensors to extract entropy from quantum properties of photons.

TRNGs always have some hardware element to them—to harness and process the raw entropy, and this hardware is typically specifically designed for the purposes of random number generation. The output of a TRNG is not influenced by any external factors or seed values, making it ideal for applications that require high levels of security, cryptographic key generation, secure communication, and unbiased statistical sampling. However, TRNGs can be more challenging to implement and are often slower than PRNGs, which rely on algorithms and can produce large sequences of "random-looking" numbers more quickly.

It is in this context the present disclosure has been devised.

SUMMARY OF THE DISCLOSURE

Viewed from one aspect, the present invention provides a computer-implemented method of generating random numbers, may include receiving data output from an instrument characterising macromolecules (such as DNA, RNA, or protein sequences) in a sample, the data including measurement event information relating to measurements of individual macromolecules recorded over time, determining, for each measurement event in a sequence of measurement events in the data, an event timing representative of the duration of event or the time passing between consecutive events, comparing data based on each event timing with a comparator value to generate a binary output, determining a bit value based on the binary output of the comparison for each event timing, generating data representative of a random number by assembling a vector of bit values determined from the event timings in sequence, wherein the determined sequence of event timings for the sequence of measurement events represents a source of entropy extracted by the comparison step to generate the random number. In embodiments, the received data output from the instrument may be genomics data from a sequencer characterising DNA, RNA, or proteomics data output from an instrument characterising biopolymers in a biological sample. In embodiments, the received data output from the instrument may be data representative of a current measured across a nanopore as a nucleic acid sequence passes through the nanopore.

In accordance with the present disclosure, data output from an instrument characterising macromolecules in a sample may be processed to use event information relating to measurements of individual macromolecules recorded over time to generate random numbers. In this way, the operation of instruments such as nanopore sequencers for generating data that can be processed to sequence DNA from a biological sample, may also be processed to generate random numbers by exploiting the entropy inherent in the measurement events relating to measurements of individual macromolecules recorded over time. Thus large volumes of random numbers can be usefully generated as a by-product of the operation of the instrument characterising the macromolecules.

In embodiments, the source of entropy may be the physical randomness arising from the interaction between the macromolecules and the environment in which the macromolecules may be measured by the instrument. In embodiments, the source of entropy may be the physical randomness arising from the fluid dynamics of the passage of the macromolecules through a microfluidic structure during measurement by the instrument. In embodiments, the data including measurement event information includes the timing in reading events of macromolecules in a flow cell.

Through rigorous statistical analysis and entropy estimation, it has been identified that the entropy arising from the operation of instruments characterising macromolecules, specifically in the variation in event timings representative of the duration of an event or the time passing between consecutive events, is usable as a source of randomness for a hardware random number generator. For example, the data processing method disclosed herein has been shown to process data output from a nanopore sequencer to generate truly random numbers. That is, it has been identified that nanopore sequencing devices have unpredictable read and gap lengths. It posited that this is due to the stochastic nature of the chemistry, in that the exact time that a single nucleotide takes to transit the nanopore is random (within limits). Read length or read dwell time is defined as the period of time for which the sequencing hardware reports DNA molecules actively being read. Gap length or gap dwell time is the duration for which no DNA molecules are read by the sequencing hardware. The term 'dwell' refers to any period of time with a distinct scope (transitioning from read to gap, gap to read, or traversing the boundary between any other pair of defined states). The size, shape and nature of macromolecules such as biopolymers or nucleic acids in a chain, passing through a microfluidics structure such as a nanopore in sequence, have been found to have an uneven motion due to the fluid dynamics and interaction of the macromolecules with the microstructure and also the neutral medium in which the macromolecules are suspended, leading to random variations in read and gap lengths as they transit through the nanopore that measures the current that characterises the macromolecules.

It was found that where a nanopore sequencer or other sequencer instrument includes the following characteristics:
  One or more sensors through which individual strings or fragments of DNA pass sequentially;
  DNA stored in a neutral medium that allows for distinction between Reads and Gaps; and
  Robust logging at the microsecond level, to minimise/eliminate duplicate Gap and Read lengths
  the randomness in the measured read and gap lengths can be revealed through processing the output data.

Other similar instruments that measure macromolecules by processing them individually in an environment may be usable as sources of entropy that output data that can be processed to extract the entropy and generate random numbers. The utility of macromolecule characteristics as a source of entropy depends on observing its movement within a medium (e.g., liquid or air), its thermal properties, or the state transitions observed during a chemical or biological process. Macromolecules observed independent of these conditions are too structured to provide useful levels of entropy. Other examples include next generation sequencing technologies and the timing of reads, in massively parallel processing of DNA, or in the reads in mass spectrometry. Often the motion of the macromolecules through microfluidics environments provides the source of entropy.

The methods disclosed herein provide a mechanism developed for extracting entropy from data generated by such macromolecule characterisation instruments, which may then be used to either seed a PRNG or as random output in its own right. Specifically, the capturing of the read and gap lengths of measurements of macromolecules in sequence as a source of randomness derived from the entropy in the instrument, has been found to be useful in generating truly random numbers. The patterning of the biological macromolecule itself (for example the sequence of individual nucleotides in DNA or RNA) has been shown to have too much inherent structure, leading to highly correlated bitstreams when used as a direct source of randomness even after a multiplexing unless said multiplexing involves use of an independent source of random numbers. In contrast, the read and gap lengths have been found to be useful when processed to provide truly random numbers. That is, the methods described herein use technical data derived from sequencing technologies (rather than the sequenced biological data itself), as an entropy pool, from which high quality entropy is drawn for use in the subsequent random number generation.

Further, given that instruments characterising macromolecules may read vast numbers of macromolecules at a very fast rate, and often many instruments characterise macromolecules in parallel, the rate of random number generation from the methods disclosed herein depends on the number of parallel devices from which it can draw dwell timings. For example, a nanopore sequencer currently generates 450 base reads a second on average, which corresponds for 450 read or gap events each useful in generating randomness for a random number generator, or 40 million such events over a day. This means a generation rate of approximately 40 million bits per day, or 0.46 kbps per device contributing to a pooled bitstream. Further, given there are large numbers of such instruments being operated on a continuous basis globally, generating useful work for a range of biomedical and research applications, the entropy in these processes can be exploited to generate in parallel a massive source of truly random numbers, without requiring dedicated hardware that needs to be specifically designed, deployed, operated, and maintained.

In embodiments, an event timing represents one of: the duration for which the instrument registers a signal indicative of an active measurement of a macromolecule; or a duration for which the instrument registers a signal indicative of a background or null activity during which no macromolecule may be being actively measured. A suitable algorithm, such as an edge detection algorithm, like a Gaussian edge detection algorithm, may be used to detect transitions from background/null activity to reads of macromolecules in the raw signal generated by the instrument, and this may then be used to extract event timing data representative of read duration and/or gap duration.

In embodiments, comparing data based on each event timing with a comparator value to generate a binary output may include generating an integer representation of the event timing, performing a modulo 2 operation on the integer representation of the event timing to determine a remainder value, determining the binary output based on the modulo 2 operation. In embodiments, the integer representation of the event timing may be a binary number, and the modulo 2 operation may determine the remainder value as the value of the last bit of the integer representation of the event timing.

Alternatively, or in addition, in embodiments, comparing data based on each event timing with a comparator value to generate a binary output may include comparing each event timing with an adjacent event timing in the sequence generating a binary value indicative of whether the event timing may be longer or shorter than the adjacent event timing, determining the binary output based on the binary value.

Both methods yield data that has been shown to pass statistical tests of randomness, including total failure tests (FIPS 140-2, monobits), Ent, and TestU01 Alphabits and Rabbit. Post-processed bitstreams pass SP800-22 (NIST). Both methods produce binary sequences that are individually unique: comparison of lengths should not produce identical, or even correlated, binary sequences when compared with the modulo method overall lengths.

In embodiments, the computer-implemented method may further include receiving the data output from the instrument as a datastream as the instrument characterises polymers in a biological sample; and generating the random numbers from the datastream as it may be received. Thus although the disclosed methods can be operated to generate truly random numbers from log data output from sequencing technologies or other suitable macromolecule characterisation instruments, the methods can also be used to operate in an in-line real time entropy extraction process on live data output during the normal functioning of the sequencing hardware.

In embodiments, generating data representative of a random number by assembling a vector of bit values determined from the event timings in sequence further may include performing a cryptographic function or a hash function on the assembled vector of bit values. Thus subsequent processing of the assembled vector of bit values may be used to generate the data representative of a random number.

In embodiments, the computer-implemented method may further include causing the generated data representative of a random number to a recipient responsive to a request for a random number. In embodiments, the computer-implemented method may further include operating a plurality of computing apparatuses to generate random numbers from data output from an instrument characterising macromolecules in a sample received at that computing apparatus, and causing the plurality of computing apparatuses to operate together to provide a distributed randomness beacon to provide a randomness pool sending random numbers responsive to requests from computing apparatus. In this way, the present disclosure may provide a service by which computing apparatuses processing macromolecule characterisation data, such as data output by a nanopore sequencer, may work together to provide a large volume of random numbers to users on demand. In embodiments, the output data representative of a random number may be used in cryptography, secure authentication, secure communications, lotteries, statistical simulations, random sampling, randomized algorithms, or as a seed for a pseudo random number generator.

Viewed from another aspect, the present invention provides apparatus for generating random numbers, may include one or more processors. The apparatus also includes memory storing instructions that, when executed by the processor, configure the apparatus to receive data output from an instrument characterising macromolecules in a sample, the data including measurement event information relating to measurements of individual macromolecules recorded over time, determine, for each measurement event in a sequence of measurement events in the data, an event timing representative of the duration of event or the time passing between consecutive events, compare data based on each event timing with a comparator value to generate a binary output, determine a bit value based on the binary output of the comparison for each event timing, generate data representative of a random number by assembling a vector of bit values determined from the event timings in sequence, wherein the determined sequence of event timings for the sequence of measurement events represents a source of entropy extracted by the comparison step to generate the random number.

In embodiments, the apparatus may further include the instrument configured for characterising macromolecules in a sample, wherein the instructions further configure the apparatus to receive the data output from the instrument as a datastream as the instrument characterises polymers in a biological sample, and generate the random numbers from the datastream as it may be received.

Viewed from another aspect, the present disclosure provides a distributed randomness beacon including a plurality of the apparatuses for generating random numbers as disclosed herein, communicatively coupled via a network. The memory of each apparatus may further include instructions that configure each apparatus to generate random numbers from data output from an instrument characterising macromolecules in a sample received at that computing apparatus, and cause the plurality of apparatuses to operate together to provide a randomness pool sending random numbers responsive to requests from computing apparatus.

Viewed from another aspect, the present invention provides a non-transitory computer-readable storage medium, the computer-readable storage medium including instructions that when executed by a computer, cause the computer to receive data output from an instrument characterising macromolecules in a sample, the data including measurement event information relating to measurements of individual macromolecules recorded over time, determine, for each measurement event in a sequence of measurement events in the data, an event timing representative of the duration of event or the time passing between consecutive events, compare data based on each event timing with a comparator value to generate a binary output, determine a bit value based on the binary output of the comparison for each event timing, generate data representative of a random number by assembling a vector of bit values determined from the event timings in sequence, wherein the determined sequence of event timings for the sequence of measurement events represents a source of entropy extracted by the comparison step to generate the random number.

It will be appreciated from the foregoing disclosure and the following detailed description of the examples that certain features and implementations described as being optional in relation to any given aspect of the disclosure set out above should be understood by the reader as being disclosed also in combination with the other aspects of the present disclosure, where applicable. Similarly, it will be appreciated that any attendant advantages described in relation to any given aspect of the disclosure set out above should be understood by the reader as being disclosed as advantages of the other aspects of the present disclosure, where applicable. That is, the description of optional features and advantages in relation to a specific aspect of the disclosure above is not limiting, and it should be understood that the disclosures of these optional features and advantages are intended to relate to all aspects of the disclosure in combination, where such combination is applicable.

BRIEF DESCRIPTION OF THE DRAWINGS

Certain examples of the present disclosure will now be described, with reference to the accompanying drawings, in which.

DETAILED DESCRIPTION

Figure 1:
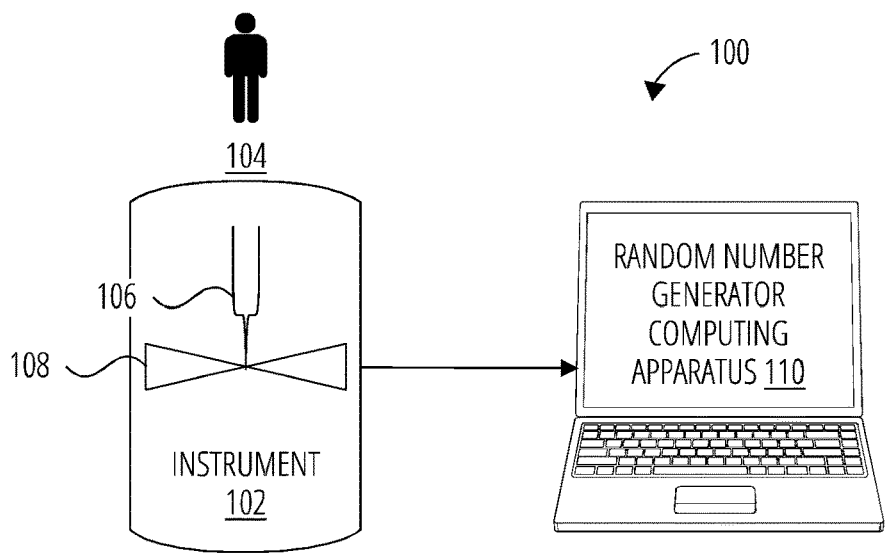
FIG. 1 shows an example of apparatus for generating random numbers in accordance with aspects of the present disclosure.

Hereinafter, examples of the disclosure are described with reference to the accompanying drawings. However, it should be appreciated that the disclosure is not limited to the described examples, and all changes and/or equivalents or replacements thereto also belong to the scope of the disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features. Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, reference to a first component and a second component may indicate different components from each other regardless of the order or importance of the components.

It will be understood that when an element (e.g., a first element) is referred to as being (physically, operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows an example of apparatus 100 for generating random numbers in accordance with aspects of the present disclosure.

The apparatus 100 comprises an instrument 102 for characterising macromolecules in a sample, communicatively coupled to provide data to a random number generator computing apparatus 110 for generating random numbers.

A macromolecule is a large and complex molecule typically composed of a long chain of smaller molecular subunits, known as monomers, covalently bonded together. These subunits can be identical or different and are repeated in a repeating pattern throughout the macromolecule's structure. Macromolecules are essential building blocks of living organisms and play vital roles in various biological processes.

There are four primary types of macromolecules found in living organisms:

Proteins: Composed of amino acid monomers, proteins are involved in various biological functions, including enzyme catalysis, cell structure, and immune responses.

Nucleic Acids: Comprising nucleotide monomers, nucleic acids store and transmit genetic information. There are two main types of nucleic acids: deoxyribonucleic acid (DNA) and ribonucleic acid (RNA).

Carbohydrates: Made up of sugar monomers, carbohydrates serve as a primary source of energy and play essential roles in cell structure and signaling.

Lipids: Consisting of fatty acid monomers, lipids function as energy reserves, cell membrane components, and signaling molecules.

The instrument 102 is one which generates data including measurement event information relating to measurements of individual macromolecules recorded over time. That is, the instrument 102 includes sensors and a physical environment in which the sensors capture measurement events in the form of active reads characterising macromolecules from a sample in their context in the physical environment, where the measurement events are temporally distributed at random due to the physical entropy in the system. The instrument 102, in the act of measuring the macromolecules in the sample in order to characterise them, thus includes a source of entropy from the physical randomness arising from the interaction between the macromolecules and the physical environment in which the macromolecules may be measured by the instrument, or from the measurement process.

For example, the source of entropy may be the physical randomness arising from the fluid dynamics of the passage of the macromolecules through a microfluidic structure during measurement by the instrument. In embodiments, the data including measurement event information includes the timing in reading events of macromolecules in their passage through a flow cell or another microfluidic structure.

In the example described herein in relation to FIG. 1, the instrument 102 is a sequencer for extracting information from a sample of macromolecules, in the example taken from a biological organism 104, in this case, a human subject. The sample taken from biological organism 104 is contained in a sample tube 106 containing polynucleotide strands from the biological organism 104. That is, the sample tube 106 may contain a sample of the DNA or RNA of the biological organism 104 suitably prepared for sequencing by the instrument 102.

In the embodiment, the example instrument 102 represents a third generation nanopore sequencer such as those available from Oxford Nanopore Technologies plc of Oxford, UK (https://nanoporetech.com/). However, the data used in the random number generator computing apparatus 110 for generating random numbers can come from any suitable source and is not limited to this kind of instrument. For example, the random number generator computing apparatus 110 can use data output from other types of sequencing technologies such as next generation sequencing technologies such as massively parallel sequencing methods of dye sequencing available from Illumina, Inc. of San Diego, CA, USA (https://www.illumina.com/). Further, any other type of instrument that characterise macromolecules in sequence, that generate data containing measurement event information relating to measurements of individual macromolecules recorded over time that is representative of a source of physical entropy in the instrument, is suitable for use in conjunction with the random number generator computing apparatus 110 to generate random numbers. For example, instruments for sequencing genomes or transcriptomes are suitable, and instruments for characterising proteomes, such as mass spectrometers, may also be suitable.

In the nanopore sequencer instrument 102 shown in FIG. 1, a transmembrane pore 108 (e.g. a nanopore) is used as an electrical biosensor for sensing genetic information in the form of the polynucleotides in a sequence in strands of DNA or RNA from the biological sample contained in the sample tube 106. Such transmembrane pores 108 can be used to identify small molecules or folded proteins and to monitor chemical or enzymatic reactions at approximately the single molecule level by means of sending the ion flow across the transmembrane pore 108, for example, as the strand of DNA/RNA passes through the transmembrane pore 108. Interaction of an analyte with the transmembrane pore 108 can give rise to a characteristic change in ion flow (for example, a characteristic current profile) as the analyte translocates through the transmembrane pore 108. That is, the ion flow (for example, electron flow/current) through a transmembrane pore 108 may be measured under a potential difference applied across the transmembrane pore 108.

Figure 2:
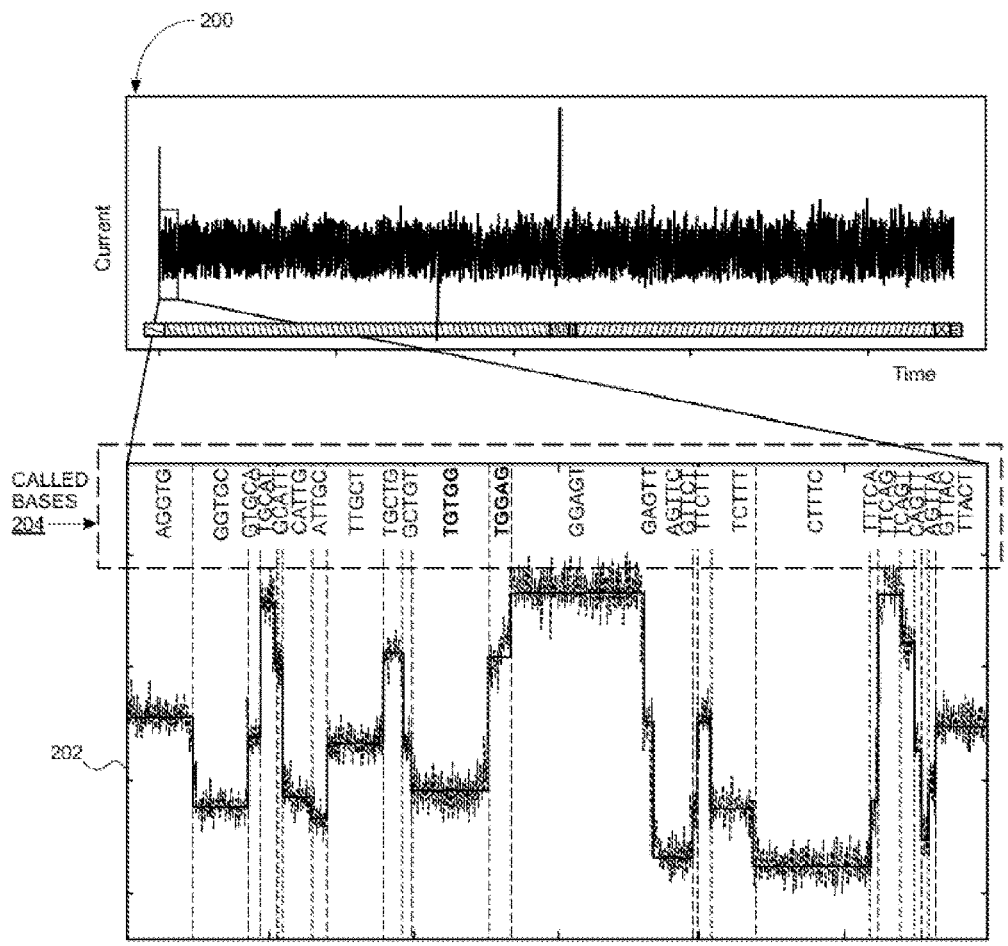
FIG. 2 shows a graph plotting raw current data output by the instrument shown in FIG. 1 over time characterising the sequence of macromolecules passing through the nanopore as identified by base calling, the current data being used by the computing apparatus for generating random numbers.

In this regard, FIG. 2 shows a graph plotting the raw current data output 200 by the nanopore sequencer instrument 102 shown in FIG. 1 over time characterising an example DNA sequence of macromolecules passing through the nanopore. The plot shows the sequence of the values of the current recorded across the transmembrane pore 108 for the duration of processing part of the sample of the biological organism 104.

A detailed view 202 of a small section of the raw current data output 200 is shown underneath. Here it can be seen that the raw current data output 200 is very noisy and produces a 'squiggle plot' that varies in its level in a way that is characteristic of the DNA nucleobases transiting through the transmembrane pore 108 at that time. For example, as a polynucleotide strand such as DNA passes through the transmembrane pore 108, the nucleobases of the DNA (i.e. adenine (A), cytosine (C), guanine (G), and thymine (T)) segment that passes through the transmembrane pore 108 produce a resultant characteristic current profile depending on which of the nucleobases is passing through the sequencer at any given moment. As can be seen in the raw current data output 200 in FIG. 2, this produces a current signal that falls to different levels indicating the sequence of nucleobases passing through the transmembrane pore 108. A computing apparatus may operate on the raw current data output 200 using an often computationally-intensive so-called 'base calling' application that typically uses a trained deep neural network to extract the progressing sequence of called bases 204 as shown in FIG. 2.

However, for the purposes of generating random numbers, as disclosed herein, the random number generator computing apparatus 110 operates on the observed current data output 200. Through rigorous statistical analysis and entropy estimation, it has been identified that the entropy arising from the operation of the nanopore sequencer instrument 102, specifically in the variation in event timings representative of the duration of an event or the time passing between consecutive events, is usable as a source of randomness for a hardware random number generator. These event timings are derivable from the raw current data output 200 by the random number generator computing apparatus 110.

Figure 3:
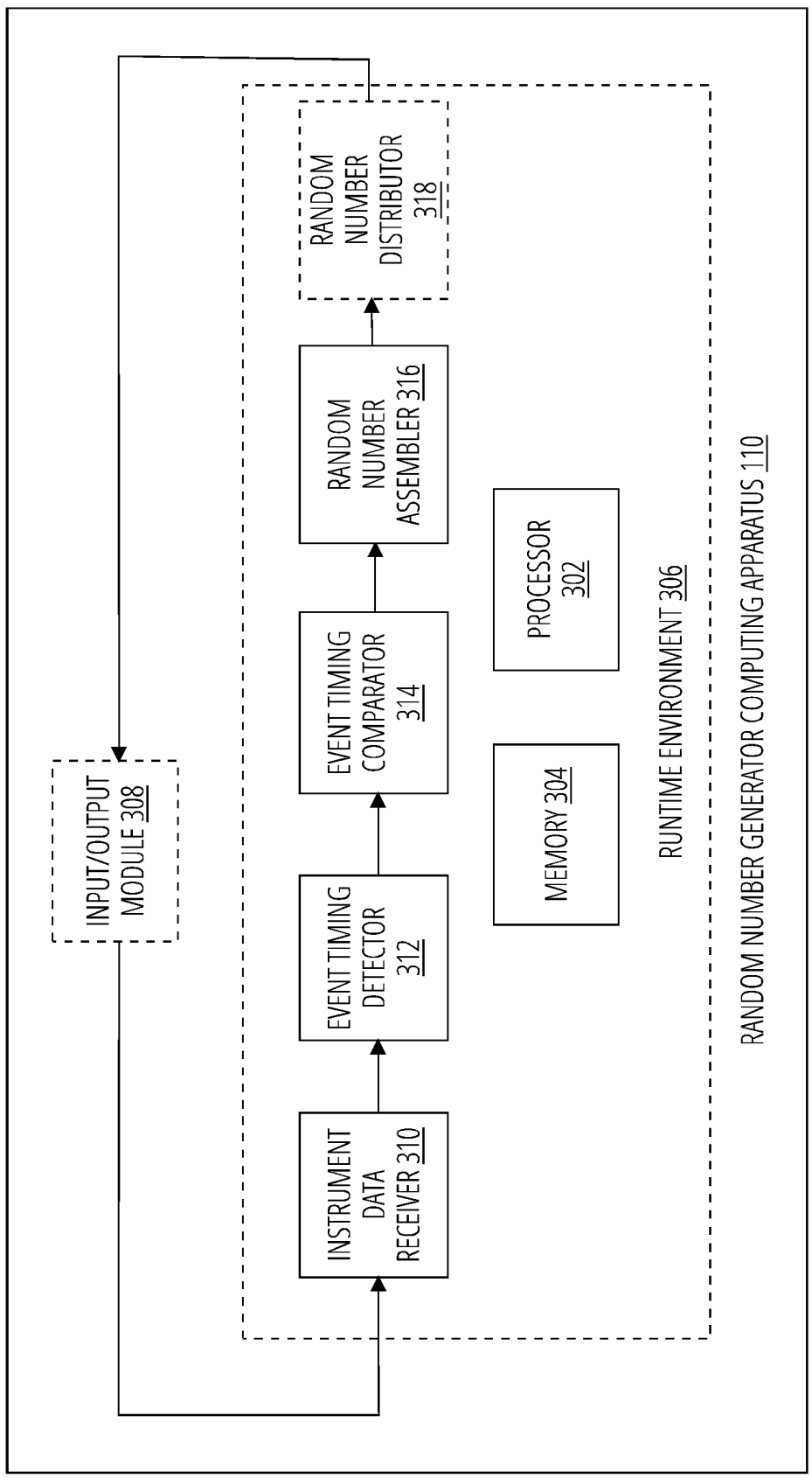
FIG. 3 shows a block diagram of an example computing apparatus for use in an apparatus for generating random numbers as shown in FIG. 1.
Figure 4:
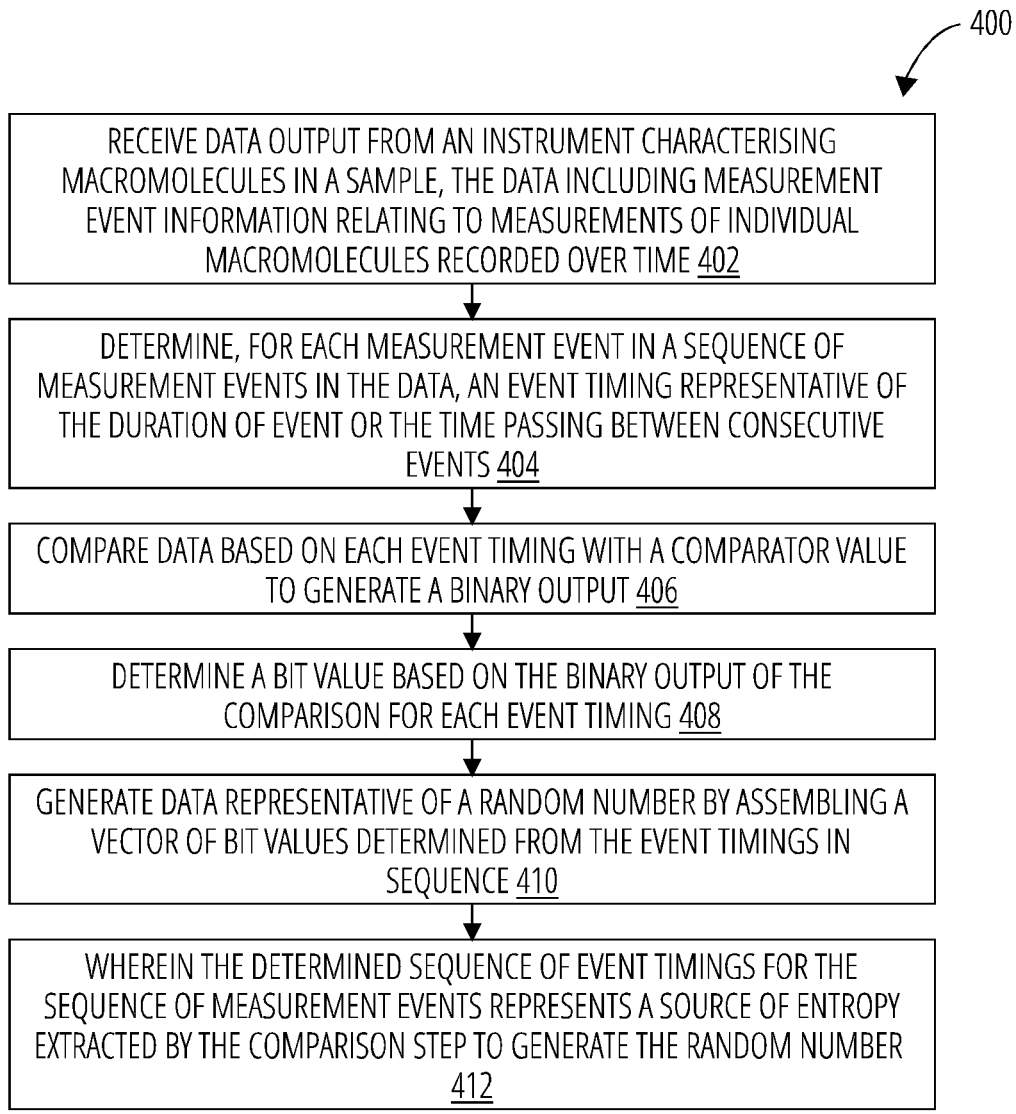
FIG. 4 shows an example method for generating random numbers in accordance with aspects of the present disclosure, the method being implemented by the example the computing apparatus shown in FIG. 3.

The operation of the example random number generator computing apparatus 110 will be now described in relation to FIG. 3 and FIG. 4.

FIG. 3 shows a block diagram of an example computing apparatus for use in an apparatus for generating random numbers as shown in FIG. 1.

The random number generator computing apparatus 110 comprises a memory 304, a processor 302, in operation, a runtime environment 306, an instrument data receiver 310, an event timing detector 312, an event timing comparator 314 and a random number assembler 316. In embodiments, the random number generator computing apparatus 110 comprises a input/output module 308, and a random number distributor 318, although as they are shown in broken lines, these may not be provided and are not needed to implement the method 400 described in relation to FIG. 4.

A bus system (not shown) may be provided which supports communication between at the least one processor 302, memory 304 and input/output module 308.

The processor 302 executes instructions that can be loaded into memory 304. The processor 302 can include any suitable number(s) and type(s) of processors or other devices in any suitable arrangement. Example types of processor include microprocessors, microcontrollers, digital signal processors, field programmable gate arrays and application specific integrated circuits.

The memory 304 may be provided by any structure(s) capable of storing and facilitating retrieval of information (such as data, program code, and/or other suitable information on a temporary or permanent basis). The memory 304 can represent a random access memory or any other suitable volatile or non-volatile storage device(s). The memory 304 may also contain one or more components or devices supporting longer-term storage of data, such as a read only memory, hard drive, flash memory, or optical disc, which may store software code for loading into the memory 304 at runtime. In use, the processor 302 and memory 304 provide a runtime environment 306 in which instructions or code loaded into the memory 304 can be executed by the processor 302 to generate instances of software modules executing in the runtime environment 306.

The random number generator computing apparatus 110 also comprises input/output module 308 providing a communications interface for receiving data from instrument 102. Although in FIG. 1 and FIG. 3 the random number generator computing apparatus 110 is shown as a stand-alone computing apparatus, it may also be connected, via input/output module 308, to other computing nodes or servers via one or more networks, such as the Internet.

In use, the random number generator computing apparatus 110 may, using instructions stored in memory 304, cause the processor 302 to implement in runtime environment 306 an instrument data receiver 310 software module, an event timing detector 312 software module, an event timing comparator 314 software module, and a random number assembler 316 software module which may operate together to carry out the method 400 described below in relation to FIG. 4. It is to be understood, however, that the partitioning of the software implementing the method 400 into software modules is purely conceptual and to help illustrate an example implementation of the method 400. The instructions implementing the method 400 may operate together in a single software module or application, or in any other suitable way.

FIG. 4 shows an example method 400 for generating random numbers in accordance with aspects of the present disclosure, the method 400 being implemented by the example random number generator computing apparatus 110 shown in FIG. 3.

In step 402, the random number generator computing apparatus 110 receives, at instrument data receiver 310 from the input/output module 308, raw current data output 200 originating from instrument 102. In embodiments, the observed current data output 200 may be received directly from the instrument 102 contemporaneously with its generation or with the operation of the instrument 102 to characterise the sample of the biological organism 104, or it may be received from the instrument 102 at a later point in time, after the instrument 102 has been operated to characterise the sample of the biological organism 104. Alternatively, the raw current data output 200 may not be received directly from the instrument 102. Instead, the raw current data output 200 may have been generated by the instrument 102 and stored elsewhere, for example in a server, acting as a store for the raw current data output 200, only to be sent to the random number generator computing apparatus 110 as needed for processing to generate random numbers.

As noted above, the observed current data output 200 characterises macromolecules in a sample, in this case, the current signal across the transmembrane pore 108 as the DNA nucleobases transit through the transmembrane pore 108. The data including measurement event information relating to measurements of individual macromolecules (i.e. DNA nucleobases) recorded over time.

The instrument data receiver 310 may store the received observed current data output 200 in the short or longer-term memory 304 of random number generator computing apparatus 110 for later processing, or it may be passed immediately to the event timing detector 312 for immediate processing.

In the example shown, the nanopore sequencer instrument 102 may pass the observed current data output 200 to random number generator computing apparatus 110 as one or more fast5 files. A channel in an Oxford Nanopore multiple-read produced fast5 file is related to a specific pore, which is monitored throughout its lifetime by the event timing detector 312 to generate the meaningful data (reads) and the intermediate periods of inactivity (gaps). Channels are identified by the read run ID (41-character string corresponding to the ONT uuid) and channel ID (4-character string, decoded as a 4-digit integer). This allows for the unique identification of channels. Channels are expressed as rows in a matrix, or 2d array, of timing data.

In step 404, the event timing detector 312 determines, for each measurement event in a sequence of measurement events in the data, an event timing representative of the duration of an event or the time passing between consecutive events. That is, the event timing represents one of:

- a 'read'—the duration for which the instrument registers a signal indicative of an active measurement of a macromolecule (i.e. in the example instrument 102, while a particular DNA molecule is transiting through the transmembrane pore 108); or
- a 'gap'—a duration for which the instrument registers a signal indicative of a background or null activity during which no macromolecule may be being actively measured (i.e. in the example instrument 102, while a particular DNA molecule is not transiting through the transmembrane pore 108).

Thus the event timing represents a sequence of times representative of a duration of a presence of a signal characterising a macromolecule or an absence of a signal characterising a macromolecule. Alternatively, event timings of durations representing both presences and absences of signal characterising a macromolecule may be extracted from the observed current data output 200.

A suitable algorithm, such as an edge detection algorithm, like a Gaussian edge detection algorithm, may be used to detect transitions from background/null activity to reads of macromolecules in the raw signal generated by the instrument 102, and this may then be used to extract event timing data representative of read duration and/or gap duration.

In the example instrument 102, generating an observed current data output 200 as shown in FIG. 2, an event timing determination process carried out by the event timing detector 312 may be based on the following.

In order to extract the event timing the nucleotide resides within the pore (named the "dwell time"), the raw current data output 200 generated by the nanopore sequencer instrument 102 for each flowcell channel is used. A sudden change of current often corresponds to a base entering or exiting the pore, and is seen as an "edge" in the observed current data output 200. The base dwell times can be inferred by determining the times between edges in the observed current data output 200. An example sub-routine for extracting dwell times from the observed current data output 200 is as follows:

1. A sliding window (window=5 time steps) median filter is applied to remove noise from the signal
2. A sliding window Gaussian edge detector is run over the denoised data using a simple kernel: [0.013, 0.108, 0.242, 0.0, −0.242, −0.108, −0.013]
3. Any peaks in the absolute value of the Gaussian signal data with a value over threshold are recorded
4. Any peak occurring less than 2 time points after a previous peak is discarded
5. The time point differences between all pairs of peaks are recorded.

The threshold value in examples can be taken to be 25, although this can be chosen based on a comparison with the unprocessed data to determine a threshold that correctly identifies the sudden changes of current. As can be seen in FIG. 2 202, the vertical dotted lines are the results of the Gaussian edge detection process. Of course, other suitable approaches are possible, but any processing of the data input by the instrument, whether it is raw current data output 200 from a nanopore sequencer, or another kind of data from a different kind of instrument, that extracts, for each measurement event in a sequence of measurement events in the data, an event timing representative of the duration of event or the time passing between consecutive events, can be used to generate the sequence of event timings.

Where required by the algorithm used in the comparison step described below, event timings corresponding to gaps may be separated from event timings corresponding to reads, by simply removing all odd indices from output channels, as the initial read will be a gap following a start-up sequence (zeroth index) followed by a read, then alternating. As gaps and reads are explicitly defined by their adjacency to one another, this method will successfully remove or split reads from gaps.

Figure 5:
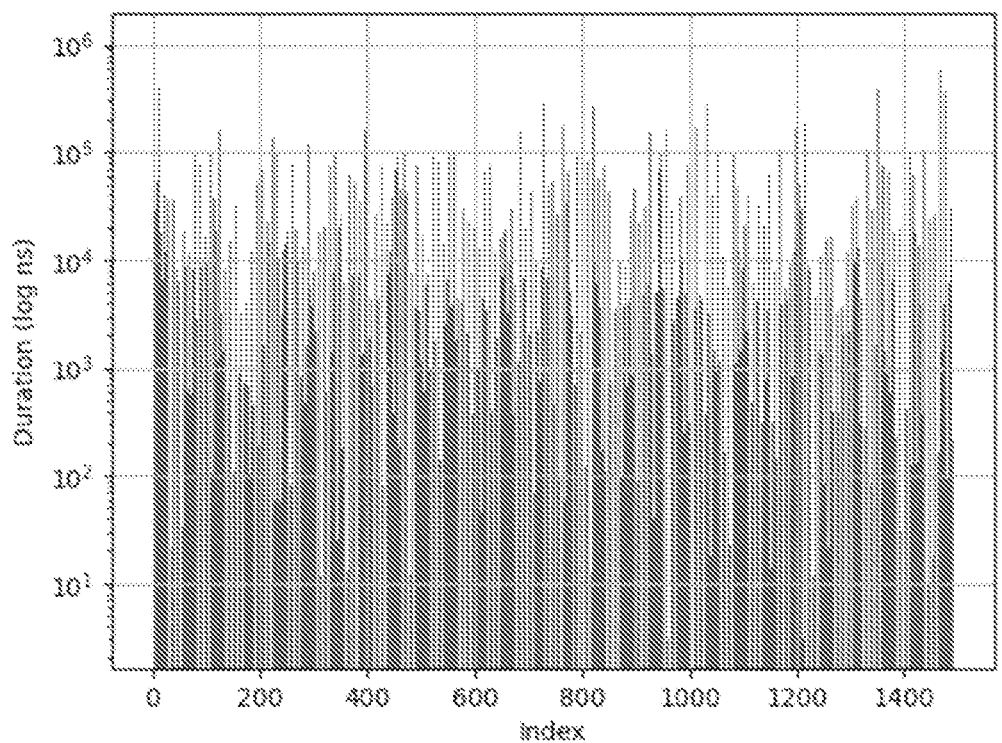
FIG. 5 shows a plot of the detected duration of open gaps between reads and the duration of reads, shown on a logarithmic scale, in example data output by a nanopore sequencer for a sequence of nucleobases read in a DNA sequence.
Figure 6:
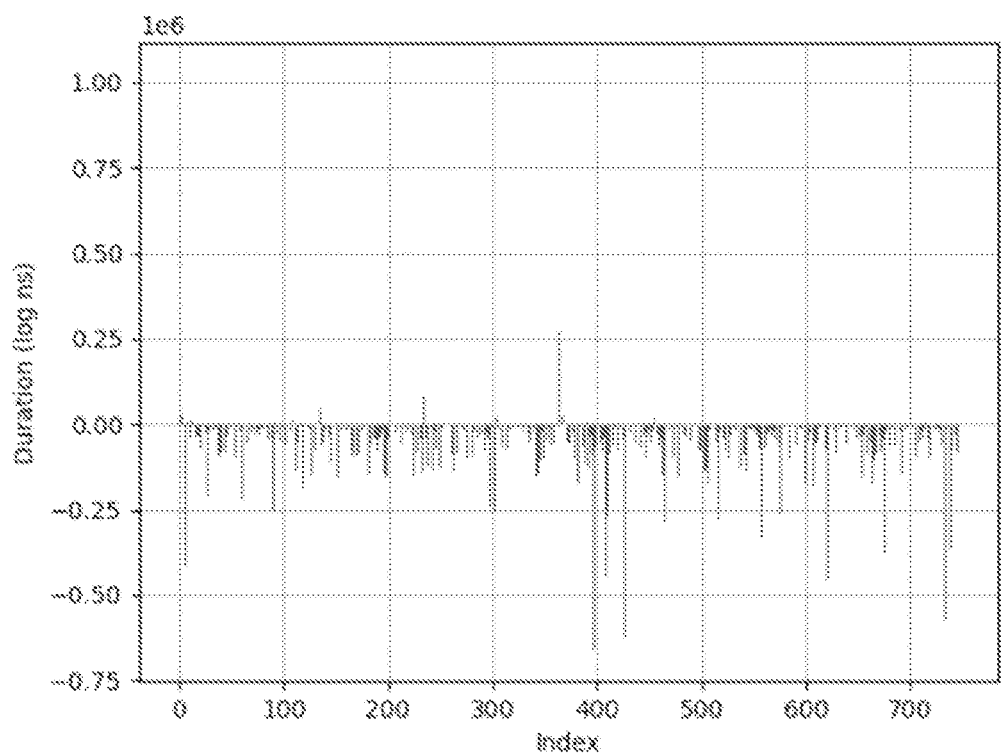
FIG. 6 shows a plot of the detected duration of the gaps shown in the plot of FIG. 6 subtracting the detected duration of an adjacent read.

To illustrate this, FIG. 5 shows a plot of the detected duration of open gaps between reads and the duration of reads, shown on a logarithmic scale, in example raw current data output by a nanopore sequencer for a sequence of nucleobases read in a DNA sequence. FIG. 6 shows a plot of the detected duration of the gaps shown in the plot of FIG. 6 subtracting the detected duration of an adjacent read. This indicates that gaps are typically shorter than reads.

Then, in step 406, the event timings are passed to event timing comparator 314 for further processing, which is for comparing data based on each event timing with a comparator value to generate a binary output.

Figures 9, 10:
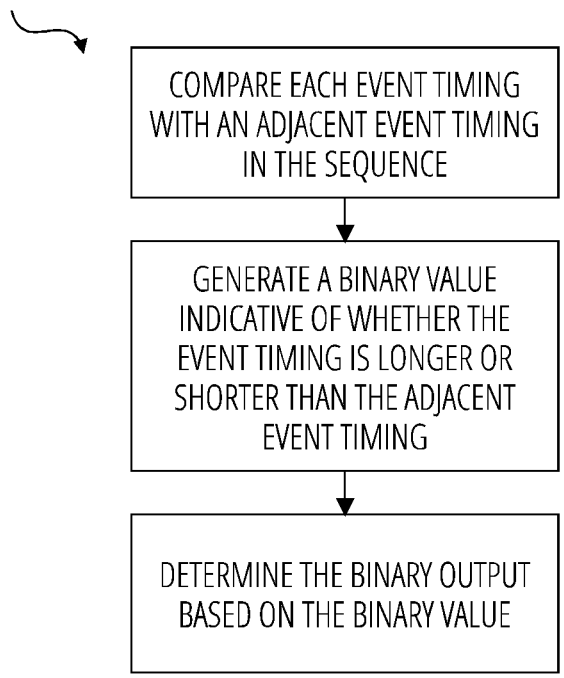
FIG. 9 shows an example of a second method for comparing data based on each event timing with a comparator value to generate a binary output for use in the method shown in FIG. 4, in accordance with aspects of the present disclosure.
FIG. 10 shows pseudocode suitable for implementing the second method shown in FIG. 9.

This step 406 of comparing the event timings by the event timing comparator 314 is performed to extract the entropy captured in the randomness of the sequence of event timings. Various methods for converting the event timings to binary outputs to assembly into random numbers are possible, provided they extract the entropy inherent in the event timings. Two such possible methods are disclosed herein, by way of example, and without limitation. A first method 700 is shown in FIG. 7, and a second method is shown in FIG. 9., and these will be described in turn.

Figures 7, 8:
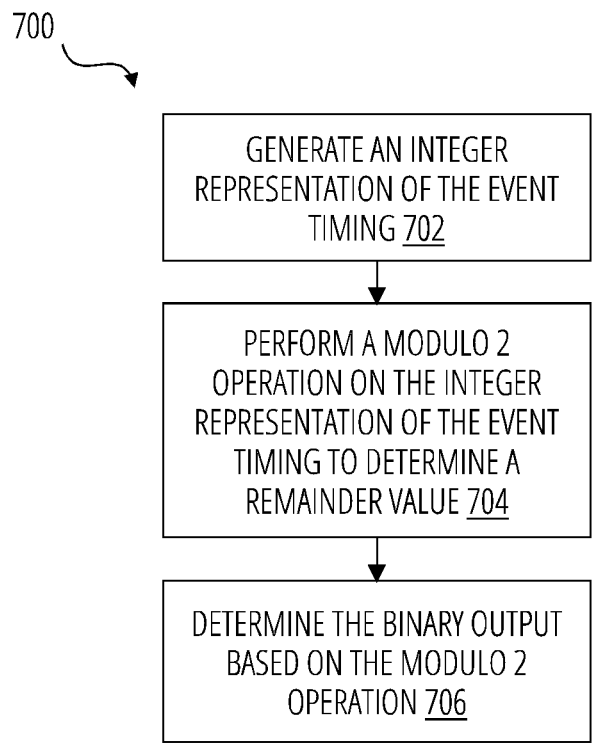
FIG. 7 shows an example of a first method for comparing data based on each event timing with a comparator value to generate a binary output for use in the method shown in FIG. 4, in accordance with aspects of the present disclosure.
FIG. 8 shows pseudocode suitable for implementing the first method shown in FIG. 7.

In this respect, FIG. 7 shows an example of a first method 700 for implementing step 406 of comparing data based on each event timing with a comparator value to generate a binary output. Pseudocode suitable for implementing the first method 700 is shown in FIG. 8.

In step 702, an integer representation of the event timing is generated. In this example method, the sequence of event timings for the reads and gaps can be used without having to remove the reads or the gaps. That is, a file containing f members of event timing data, in the form of double precision numbers representing discrete durations (of both gaps and reads), is iterated over. These event timings are each converted to integer representations i.

Then, in step 704, a modulo 2 operation (i.e. l[i] mod 2, where i is a dwell within a list of sequential dwells l) is performed on the integer representation of each event timing (dwell) in sequence to determine a remainder value.

Then, in step 706, a binary output is determined based on the modulo 2 operation. For example, if l[i] mod 2==0, the binary output is determined to be zero. If l[i] mod 2≠0, the binary output is determined to be one.

In embodiments, the integer representation of the event timing may be a binary number, and the modulo 2 operation may determine the remainder value as the value of the last bit of the integer representation of the event timing.

In this method 700, both gaps and reads can be used, as lengths (l) are not compared based on magnitude, but by the output of l[i] mod 2. Even timings result in a 0 and odd result in a 1.

FIG. 9 shows an example of a second method 900 for comparing data based on each event timing with a comparator value to generate a binary output for use in the method shown in FIG. 4. Pseudocode suitable for implementing the second method 900 is shown in FIG. 10.

In step 902, the method 900 includes comparing each event timing with an adjacent event timing in the sequence to generate a binary value—i.e. indicative of whether the event timing is longer or shorter than the adjacent event timing. In this example, read lengths (or alternatively, gap lengths) for a nanopore sequence can be discarded. This is due to a correlation between gaps and reads where the gap duration was found to be less than the read duration for the majority of observed current data output tested from a nanopore sequencer. This relationship makes intuitive sense, as any non-fragmentary read is almost certain to be of a longer duration than any gap. Similarly, once a sample has been reduced to highly fragmented DNA, the inverse relationship will become dominant for what remains of the data collection process. This makes mixed data sets containing gaps and reads too highly correlated to be useful as an entropy source. Thus the reads (or in the alternative, the gaps) may be removed.

This step 902 can be achieved by, once the reads are removed from the file, f, sorting the gaps (g) in order of occurrence, and operating a sliding window in which the current and next indices of g are compared. No conversion to an integer is necessary in this case, and instead the event timings of the adjacent gaps are directly compared.

Then, in step 906, the binary value indicative of the comparison of whether the event timing is longer or shorter than the adjacent event timing is converted to the binary output. Consider two sequential dwells, or intervals of time associated with discrete events, referred to here as l[i] and l[i+1]. In the example shown in FIG. 10, if l[i] is shorter than l [i+1], a binary value of zero is assigned. If l[i] is longer than l[i+1], a binary value of one is assigned.

Returning to FIG. 4, in step 408 the event timing comparator 314 determines a bit value based on the binary output of the comparison for each event timing. This is a simple expression of the binary output of the comparison step 406 as a bit having a value of 0 or 1.

Thus the output of the event timing comparator 314 in step 408 is a stream of bits as the raw current data output 200 is processed to generate event timings that are compared with a comparator value.

In step 410, the random number assembler 316 receives this stream of bits and generates data representative of a random number by assembling a vector of the bit values determined from the event timings in sequence. For example, if a 32 bit random number is needed, the random number assembler 316 assembles a vector of 32 consecutive bit values output from the event timing comparator 314 in step 408.

The random number assembler 316 may further process the vector of bit values to generate the random number performing subsequent processing on the assembled vector of bit values, such as by performing a cryptographic function or a hash function on the assembled vector of bit values. Thus subsequent processing of the assembled vector of bit values may be used to generate the data representative of a random number.

Both method 700 and method 900 yield data that has been shown to pass robust statistical tests of randomness. Both methods produce binary sequences that are unpredictable without explicit access to the underlying current data from which a sequence is derived: comparison of lengths should not produce identical, or even correlated, binary sequences when compared with the modulo method overall lengths. Furthermore, no set of similar samples (e.g. same fluid suspension and DNA mix) can be used to gain advantage when guessing the output of a similar sample operated on by methods 700 or 900. As reads are discarded by method 900, it is less efficient than method 700 in its use of source data and generates smaller output sequences relative to input data. It has been shown that, for gigabytes of observed current data output 200 output from a nanopore sequencer, converted to megabytes of sequence data, will yield a few hundreds of kilobytes of binary data using method 900. Method 700 can produce orders of magnitude more data, depending on the threshold values used to define the boundaries between individual dwells.

Generally, the method 400 and random number generator computing apparatus 110 can be adapted to operate with any instrument 102 that characterises macromolecules in a sample and produces data including measurement event information relating to measurements of individual macromolecules recorded over time. In the case of sequencer instruments, that is, the sequencer includes the following characteristics:

One or more sensors through which individual strings or fragments of e.g. DNA pass sequentially;
The sample stored in a neutral medium that allows for distinction between Reads and Gaps; and
Robust logging at the microsecond level, to minimise/eliminate duplicate Gap and Read lengths Where the instrument includes physical randomness as a source of entropy that translates to randomness in the read and gap dwell times observable in the detection of macromolecules passing through a sequential reader (e.g., nanopore), the randomness in the measured read and gap dwells can be revealed through processing the output data using the method 400.

Other similar instruments that measure macromolecules by processing them individually in an environment have been found to similarly be usable as sources of entropy that output data that can be processed to extract the entropy and generate random numbers. In embodiments, the source of entropy may be the physical randomness arising from the interaction between the macromolecules and the environment in which the macromolecules may be measured by the instrument. In embodiments, the source of entropy may be the physical randomness arising from the fluid dynamics of the passage of the macromolecules through a microfluidic structure during measurement by the instrument. In embodiments, the data including measurement event information includes the timing in reading events of macromolecules in their passage through a flow cell.

The data representative of a random number may be stored locally in memory 304, or sent via input/output module 308 to a server for storage or distribution, or to a remote computer apparatus that has requested to be provided with a random number. The random number distributor 318 may govern the storage and distribution of random numbers generated by the random number generator computing apparatus 110, and any other random number generator computing apparatuses with which it may cooperate to provide a distributed randomness beacon.

Figure 11:
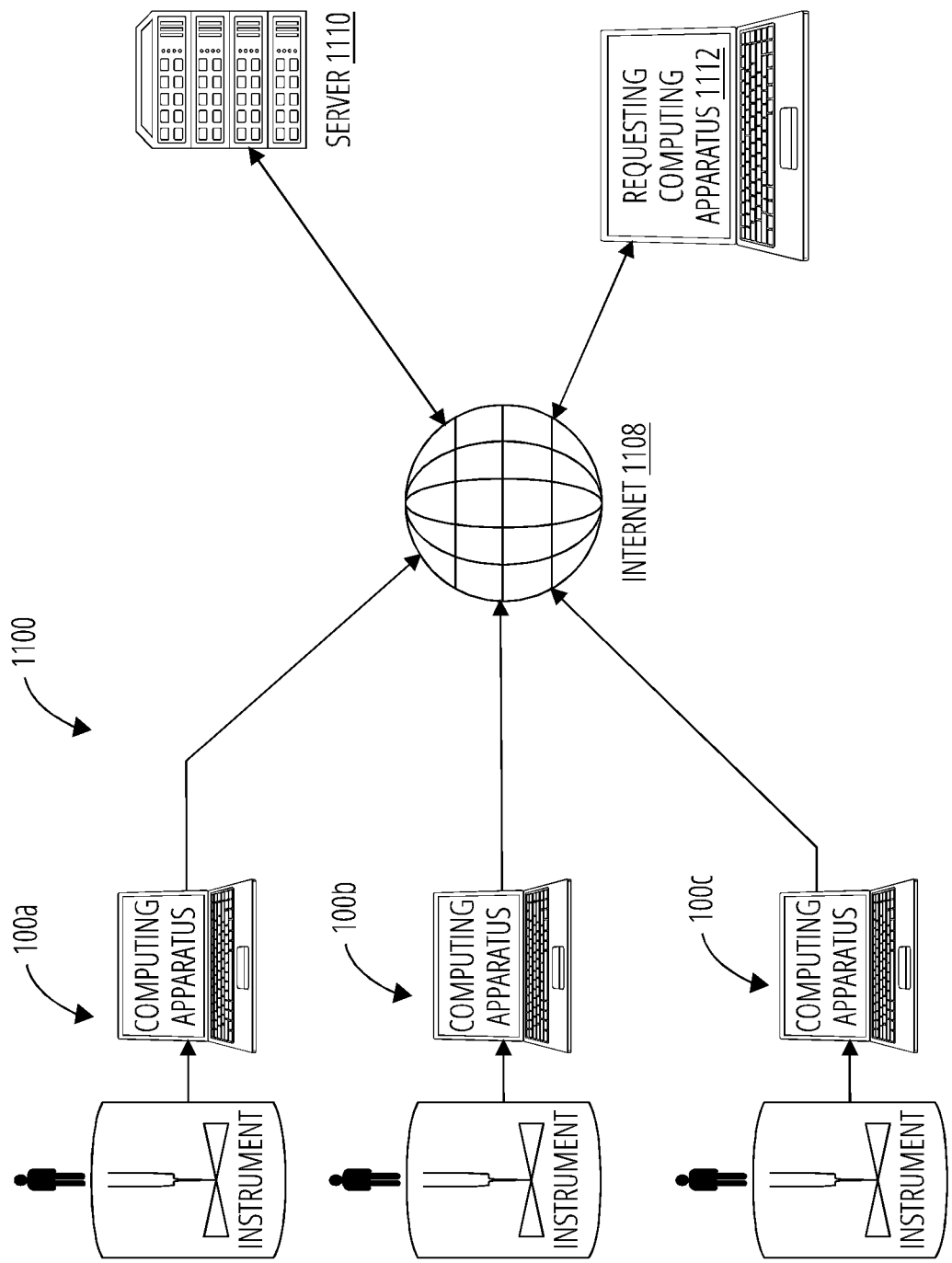
FIG. 11 shows a distributed randomness beacon including a plurality of networked apparatuses for generating random numbers as shown in FIG. 1, in accordance with aspects of the present disclosure.

In this respect, FIG. 11 shows a distributed randomness beacon including a plurality of networked apparatuses for generating random numbers as shown in FIG. 1, in accordance with aspects of the present disclosure.

That is, in embodiments, random number generator computing apparatus 110 may be configured by instructions stored in memory 304 to implement the random number distributor 318 such that the random number generator computing apparatus 110 operates together with a plurality of random number generator computing apparatuses to provide a distributed randomness beacon to provide a randomness pool sending random numbers responsive to requests from computing apparatus.

That is, as shown in FIG. 11, a distributed randomness beacon apparatus 1100 is provided by a first random number generating apparatus 100*a*, a second random number generating apparatus 100*b*, and a third random number generating apparatus 100*c*, each including a respective macromolecule characterisation instrument and random number generator computing apparatus 110. The first random number generating apparatus 100*a*, second random number generating apparatus 100*b*, and third random number generating apparatus 100*c* are each communicatively coupled by a network to the Internet 1108, which is also coupled to one or more servers 1110, and a requesting computing apparatus 1112. Although only three random number generator computing apparatuses are shown, this is not intended to be limiting and a distributed randomness beacon apparatus 1100 may include any number of random number generator computing apparatuses.

The first random number generating apparatus 100*a*, second random number generating apparatus 100*b*, and third random number generating apparatus 100*c* may each generate random numbers based on raw current data output generated by their respective instruments, and they may cooperate to provide to the requesting computing apparatus 1112 random numbers on receipt of requests therefrom. Alternatively, or in addition, the first random number generating apparatus 100a, second random number generating apparatus 100b, and third random number generating apparatus 100c may cooperate to provide random numbers to the one or more servers 1110 where they may be stored for later distribution to requesting computing apparatus 1112. One or more of the servers 1110 may cooperate with the first random number generating apparatus 100a, second random number generating apparatus 100b, and third random number generating apparatus 100c to provide the distributed randomness beacon apparatus 1100.

In this way, the plurality of random number generator computing apparatuses operate together to provide a randomness pool sending random numbers responsive to requests from computing apparatus. That is, the present disclosure may provide a service by which computing apparatuses processing macromolecule characterisation data, such as data output by a nanopore sequencer, may work together to provide a large volume of random numbers to users on demand. As there are increasing numbers of sequencer instruments, in particular nanopore sequencers in use, performing an increasing amount of biotechnology research and clinical studies, they can be harnessed to provide an important source of entropy for true random number generation that has a wide range of technically useful applications.

In embodiments, the output data representative of a random number may be used in cryptography, secure authentication, secure communications, lotteries, statistical simulations, random sampling, randomized algorithms, or as a seed for a pseudo random number generator.

In accordance with the present disclosure, data output from an instrument characterising macromolecules in a sample may be processed to use event information relating to measurements of individual macromolecules recorded over time to generate random numbers. In this way, the operation of instruments such as nanopore sequencers for generating data that can be processed to sequence DNA from a biological sample, may also be processed to generate random numbers by exploiting the entropy in herein in the measurement events relating to measurements of individual macromolecules recorded over time. Thus large volumes of random numbers can be usefully generated as a by-product of the operation of the instrument characterising the macromolecules.

It has been identified that the nanopore sequencing instrument under normal conditions of use has unpredictable read and gap length variations. It posited that this is due to the stochastic nature of the chemistry, in that the exact time that a single nucleotide takes to transit the nanopore is random (within limits). The size, shape and nature of macromolecules such as biopolymers or nucleic acids in a chain, passing through a microfluidics structure such as a nanopore in sequence, have been found to have an uneven motion due to the fluid dynamics and interaction of the macromolecules with the microstructure and also the neutral medium in which the macromolecules are suspended, leading to random variations in read and gap lengths as they transit through the nanopore that measures the current that characterises the macromolecules.

Through statistical analysis or observed sequence probabilities/characteristics and entropy estimation, it has been identified that the entropy arising from the operation of instruments characterising macromolecules, specifically in the variation in event timings representative of the duration of an event or the time passing between consecutive events, is usable as a source of randomness for a hardware random number generator. For example, the data processing method disclosed herein has been shown to process data output from a nanopore sequencer to generate truly random numbers. That is, it has been identified that nanopore sequencing devices have unpredictable read and gap lengths. It posited that this is due to the stochastic nature of the chemistry and fluid dynamics of the suspension medium, in that the exact time that a single nucleotide takes to transit the nanopore is unpredictable (within limits). The size, shape and nature of macromolecules such as biopolymers or nucleic acids in a chain, passing through a microfluidics structure such as a nanopore in sequence, have been found to have an uneven motion due to the fluid dynamics and interaction of the macromolecules with the microstructure and also the neutral medium in which the macromolecules are suspended, leading to random variations in read and gap lengths as they transit through the nanopore that measures the current that characterises the macromolecules.

It was found that where a nanopore sequencer or other sequencer instrument includes the following characteristics:
  One or more sensors through which individual strings or fragments of DNA pass sequentially;
  DNA stored in a neutral medium that allows for distinction between Reads and Gaps; and
  Robust logging at the microsecond level, to minimise/eliminate duplicate Gap and Read lengths
  the randomness in the measured read and gap lengths can be revealed through processing the output data.

Other similar instruments that measure macromolecules by processing them individually in an environment have been found to similarly be usable as sources of entropy that output data that can be processed to extract the entropy and generate random numbers. Other examples include next generation sequencing technologies and the timing of reads, in massively parallel processing of DNA, or in the reads in mass spectrometry. Often the motion of the macromolecules through microfluidics environments provides the source of entropy.

The methods disclosed herein provide a mechanism developed for extracting entropy from data generated by such macromolecule characterisation instruments, which may then be used to either seed a PRNG or as random output in its own right. Specifically, the capturing of the read and gap lengths of measurements of macromolecules in sequence as a source of randomness derived from the entropy in the instrument, has been found to be useful in generating truly random numbers.

That is, the methods described herein use technical data derived from sequencing technologies (rather than the sequenced biological data itself), as an entropy pool, from which high quality entropy is drawn for use in the subsequent random number generation.

Further, given that instruments characterising macromolecules may typically read vast numbers of macromolecules at a very fast rate, and often many instruments characterise macromolecules in parallel, the rate of random number generation from the methods disclosed herein depends on the number of parallel devices from which it can draw dwell timings. For example, a nanopore sequencer currently generates 450 base reads a second on average, which corresponds for 450 read or gap events each useful in generating randomness for a random number generator, or 40 million such events over a day. This means a generation rate of approximately 40 million bits per day, or 0.46 kbps per device contributing to a pooled bitstream. This is only one such reader technology, though all have similar constraints in terms of extraction traits of usable entropy from useful data. Further, given there are large numbers of such instruments being operated on a continuous basis globally, generating useful work for a range of biomedical and research applications, the entropy in these processes can be exploited to generate in parallel a massive source of truly random numbers, without requiring dedicated hardware that needs to be specifically designed, deployed, operated, and maintained.

True random numbers have various applications across different fields due to their inherent unpredictability and lack of pattern. Some of the main uses of true random numbers include:

Cryptography: True random numbers are crucial for generating secure cryptographic keys, ensuring that encryption and decryption processes remain highly secure and resistant to attacks.

Secure Communications: Random numbers are used to create random session keys in secure communication protocols, enhancing the confidentiality and integrity of data transmission.

Lotteries and Gambling: In gaming and lotteries, true random numbers are used to ensure fairness and prevent any bias or predictability, creating a truly random outcome.

Monte Carlo Simulations: True random numbers are used in statistical simulations, such as Monte Carlo methods, to model complex systems and analyze uncertainties in various fields, including finance, engineering, and science.

Random Sampling: In research and statistical analysis, random numbers are used to select random samples from a population, ensuring unbiased representation and accurate results.

Randomized Algorithms: True random numbers are employed in various randomized algorithms to optimize computations and find approximate solutions to complex problems efficiently.

Art and Creativity: True random numbers are used by artists and creative professionals to introduce an element of randomness and unpredictability into artistic creations, generating unique and unexpected results.

Secure Authentication: Random numbers are used in one-time passwords and other authentication methods to provide an additional layer of security in login processes.

Randomized Clinical Trials: In medical research, true random numbers are used to allocate participants into different treatment groups, ensuring unbiased and scientifically rigorous results.

Random Number Generation Tests: True random numbers are used to test and evaluate the quality and randomness of pseudo-random number generators (PRNGs) used in various applications.

In all these cases, the use of true random numbers is critical to achieving genuine unpredictability and eliminating any biases or patterns that could compromise the integrity, fairness, and security of the processes and applications in which they are utilized.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. In particular, any dependent claims may be combined with any of the independent claims and any of the other dependent claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer-implemented method of generating random numbers, comprising:
   receiving data output from an instrument characterising macromolecules in a sample, the data including measurement event information relating to measurements of individual macromolecules recorded over time;
   determining, for each measurement event in a sequence of measurement events in the data, an event timing (or dwell) representative of the duration of event or the time passing between consecutive events;
   comparing data based on each event timing with a comparator value to generate a bit value;
   generating data representative of a random number by assembling a vector of bit values determined from the event timings in sequence;
   wherein the determined sequence of event timings for the sequence of measurement events represents a source of entropy extracted by the comparison step to generate the random number.

2. The computer-implemented method of claim 1, wherein the received data output from the instrument is genomics data from a sequencer characterising DNA, RNA, or proteomics data output from an instrument characterising biopolymers in a biological sample.

3. The computer-implemented method of claim 1, wherein the received data output from the instrument is data representative of a current measured across a nanopore as a nucleic acid sequence passes through the nanopore.

4. The computer-implemented method of claim 1, wherein comparing data based on each event timing with a comparator value to generate a bit value comprises:
   generating an integer representation of the event timing;
   performing a modulo 2 operation on the integer representation of the event timing to determine a remainder value;
   determining the bit value based on the modulo 2 operation.

5. The computer-implemented method of claim 4, wherein the integer representation of the event timing is a binary number, and the modulo 2 operation determines the remainder value as the value of the last bit of the integer representation of the event timing.

6. The computer-implemented method of claim 1, wherein comparing data based on each event timing with a comparator value to generate a bit value comprises:
   comparing each event timing with an adjacent event timing in the sequence;
   generating a binary value indicative of whether the event timing is longer or shorter than the adjacent event timing;
   determining the bit value based on the binary value.

7. The computer-implemented method of claim 1, further comprising receiving the data output from the instrument as a datastream as the instrument characterises polymers in a biological sample; and generating the random numbers from the datastream as it is received.

8. The computer-implemented method of claim 1, wherein generating data representative of a random number by assembling a vector of bit values determined from the event timings in sequence further comprises performing a cryptographic function or a hash function on the assembled vector of bit values.

9. The computer-implemented method of claim 1, further comprising causing the generated data representative of a random number to a recipient responsive to a request for a random number.

10. The computer-implemented method of claim 1, further comprising operating a plurality of computing apparatuses to generate random numbers from data output from an instrument characterising macromolecules in a sample received at that computing apparatus, and causing the plurality of computing apparatuses to operate together to provide a distributed randomness beacon to provide a randomness pool sending random numbers responsive to requests from computing apparatus.

11. The computer-implemented method of claim 1, where in the output data representative of a random number is used in cryptography, secure authentication, secure communications, lotteries, statistical simulations, random sampling, randomized algorithms, or as a seed for a pseudo random number generator.

12. The computer-implemented method of claim 1, wherein the source of entropy is the physical randomness arising from the interaction between the macromolecules and the environment in which the macromolecules are measured by the instrument.

13. The computer-implemented method of claim 1, wherein the source of entropy is the physical randomness arising from the fluid dynamics measured by observing the passage of the macromolecules through a microfluidic structure during measurement by the instrument.

14. The computer-implemented method of claim 1, wherein the data including measurement event information includes the timing in reading events of macromolecules in their passage through a flow cell.

15. The computer-implemented method of claim 1, wherein an event timing represents one of:
   the duration for which the instrument registers a signal indicative of an active measurement of a Macromolecule; or
   a duration for which the instrument registers a signal indicative of a background or null activity during which no Macromolecule is being actively measured.

16. Apparatus for generating random numbers, comprising:
   one or more processors; and
   a memory storing instructions that, when executed by the processor, configure the apparatus to:
   receive data output from an instrument characterising macromolecules in a sample, the data including measurement event information relating to measurements of individual macromolecules recorded over time;
   determine, for each measurement event in a sequence of measurement events in the data, an event timing representative of the duration of event or the time passing between consecutive events;
   compare data based on each event timing with a comparator value to generate a bit value;
   generate data representative of a random number by assembling a vector of bit values determined from the event timings in sequence;
   wherein the determined sequence of event timings for the sequence of measurement events represents a source of entropy extracted by the comparison step to generate the random number.

17. Apparatus as claimed in claim 16, further comprising the instrument configured for characterising macromolecules in a sample;
   wherein the instructions further configure the apparatus to:
   receive the data output from the instrument as a datastream as the instrument characterises polymers in a biological sample; and
   generate the random numbers from the datastream as it is received.

18. A distributed randomness beacon comprising:
   a plurality of the apparatuses for generating random numbers as claimed in claim 16 communicatively coupled via a network;
   wherein each apparatus further comprises instructions that further configure each apparatus to:
   generate random numbers from data output from an instrument characterising macromolecules in a sample received at that computing apparatus; and
   cause the plurality of apparatuses to operate together to provide a randomness pool sending random numbers responsive to requests from computing apparatus.

19. A non-transitory computer-readable storage medium, the computer-readable storage medium including instructions that when executed by a computer, cause the computer to:
   receive data output from an instrument characterising macromolecules in a sample, the data including measurement event information relating to measurements of individual macromolecules recorded over time;
   determine, for each measurement event in a sequence of measurement events in the data, an event timing representative of the duration of event or the time passing between consecutive events;
   compare data based on each event timing with a comparator value to generate a bit value;
   generate data representative of a random number by assembling a vector of bit values determined from the event timings in sequence;
   wherein the determined sequence of event timings for the sequence of measurement events represents a source of entropy extracted by the comparison step to generate the random number.

* * * * *